H. F. MIKESCH & E. ROMAN.
AUTOMATIC CHECK VALVE FOR FAUCETS.
APPLICATION FILED MAR. 19, 1906.
910,213.
Patented Jan. 19, 1909.
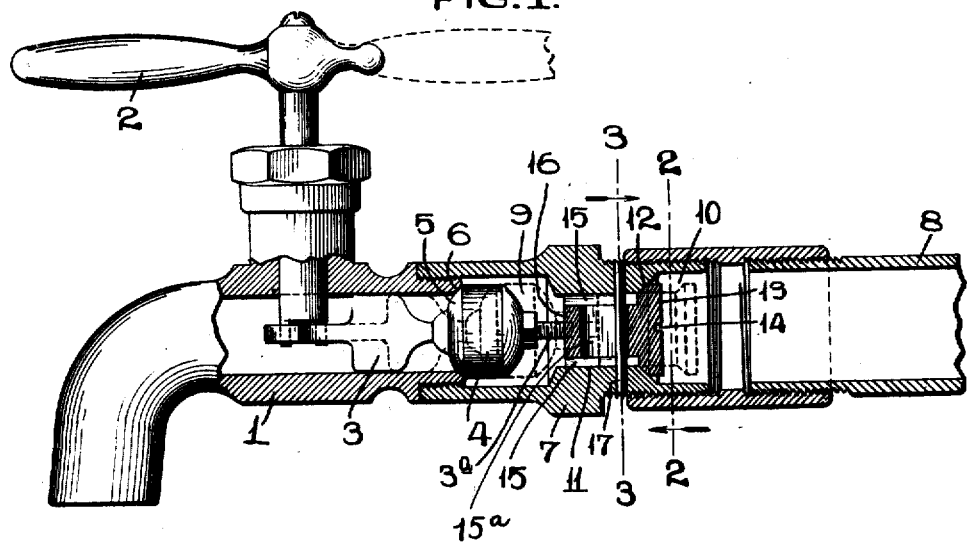
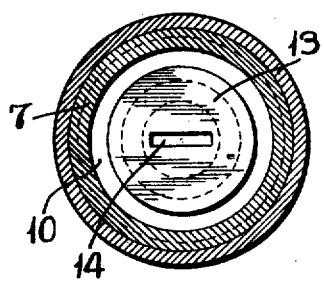
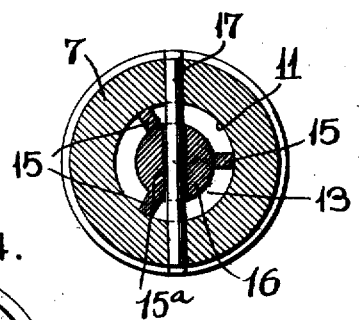
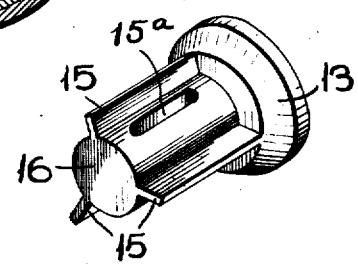
ATTEST.
H. J. Fletcher.
W. P. Smith.
INVENTORS.
HENRY F. MIKESCH.
EDWARD ROMAN.
BY Higdon & Longan
ATTY'S

UNITED STATES PATENT OFFICE.

HENRY F. MIKESCH AND EDWARD ROMAN, OF ST. LOUIS, MISSOURI.

AUTOMATIC CHECK-VALVE FOR FAUCETS.

No. 910,213.　　　Specification of Letters Patent.　　　Patented Jan. 19, 1909.

Application filed March 19, 1906. Serial No. 306,867.

*To all whom it may concern:*

Be it known that we, HENRY F. MIKESCH and EDWARD ROMAN, both citizens of the United States, and residents of St. Louis, Missouri, have invented certain new and useful Improvements in Automatic Check-Valves for Faucets, of which the following is a specification containing a full, clear, and exact description, reference being had to the accompanying drawings, forming a part hereof.

Our invention relates to an automatic check valve for faucets, and the object of our invention is to construct a combined automatic check valve with a faucet, which check valve automatically closes to shut off the supply of water whenever the faucet is removed from the end of the service pipe to be repaired or cleaned.

To the above purposes, our invention consists of certain novel features of construction and arrangement of parts which will be hereinafter more fully set forth, pointed out in our claim, and illustrated in the accompanying drawings, in which:—

Figure 1 is a vertical section through the center of a faucet and check valve of our improved construction; Fig. 2 is an enlarged transverse section taken on the line 2—2 of Fig. 1; Fig. 3 is an enlarged transverse section taken on the line 3—3 of Fig. 1; Fig. 4 is a perspective view of the automatic check valve we make use of in carrying out our invention.

Referring by numerals to the accompanying drawings: 1 designates a faucet which may be of any suitable construction, and provided with the usual operating handle 2, which is connected to and imparts reciprocating motion to the valve stem 3, carrying on its rear end a valve 4, provided with a rubber bearing ring 5, which closes against a valve seat 6 formed in the rear end of the faucet 1.

The rear end of the faucet 1 is screwed into a nipple 7, the rear end of which is connected in any suitable manner to the liquid supply pipe 8. The forward end of the nipple 7 is provided with a chamber 9, in which the valve 4 operates, and formed in the rear end of the nipple is a chamber 10. Connecting the chambers 9 and 10 is a cylindrical opening 11, through which an automatic valve, hereinafter described, operates; and formed on the shoulder between the opening 11 and chamber 10 is a conical valve seat 12.

The automatic valve comprises a disk 13, the forward edge of which is beveled so as to fit the conical valve seat 12, and formed in the rear face of said disk is a groove 14 which is adapted to receive the point of a screw-driver, or like tool. Formed integral with the front face of the disk 13 is a forwardly projecting plug 16, provided with wings 15, which latter are so arranged as that they bear against the surface of the opening 11. The plug 16 is of such a length as that when the disk 13 is seated upon the conical valve seat 12, and the bearing ring 5 is closed upon the valve seat 6, the rear end 3ª of the valve stem 3 engages against the front face of said plug 16.

Passing diametrically through the rear portion of the nipple 7 is a pin 17, which also passes through a slot 15ª formed through the plug 16, and which prevents the automatic valve comprising the disk 13, plug 16, and wings 15, from accidental displacement or removal from the opening 11.

When the handle 2 of the faucet 1 is engaged and swung into a position so as to open said faucet or move the valve 4 rearwardly away from the valve seat 6, the rear end 3ª of the valve stem, pressing on the plug 16, forces the disk 13 away from the valve seat 12, and thus the liquid is free to pass from the supply pipe 8 through the nipple 7, and through the faucet 1.

When the handle 2 is shifted so as to close the faucet and bring the bearing ring 5 against the valve seat 6, the pressure of the liquid on the rear side of the disk 13 will cause the same to move forwardly through the opening 11 until said disk 13 closes upon the valve seat 12.

When it is desired to clean, repair, or repack the faucet 1, the same is unscrewed from the nipple 7, and when removed therefrom, the pressure of the liquid against the rear side of the disk 13 causes the same to close upon the valve seat 12; and thus said liquid is prevented from discharging through the nipple 7.

Thus, any faucet equipped with our automatic check valve may be removed without interfering with the service of the other faucets, and it is not necessary to cut off the entire supply through the service pipe.

The device is very simple and inexpensiv and can be applied to all forms of faucets wherein a reciprocating valve is made use of.

The groove 14 is provided so that should it become necessary, the disk 13 and valve seat 12 can be ground so as to make a perfect fit by removing the nipple 7, placing a small amount of pulverized emery, or analogous material, on the valve seat 12, and then rotating the disk 13 by means of a screw-driver, or like tool.

While a faucet of our improved construction is closed, the normal pressure of the water or liquid is upon the disk 13, thus in a measure reducing the pressure upon the bearing ring 5 of the faucet valve, thus normally increasing the length of time that said bearing ring can be used.

A device of our improved construction is applicable for use in combination with all forms of faucets and cocks, wherein a reciprocating valve stem is made use of.

We claim:—

The combination with a reciprocating valve faucet and a supply pipe, of a nipple uniting the faucet and supply pipe which nipple entirely incloses the faucet valve, in the rear end of which nipple is formed a valve seat, an independently operating cylindrical valve arranged for reciprocation in the nipple and with which cylindrical valve the faucet valve is adapted to engage longitudinally disposed wings integral with the body of the cylindrical valve, which wings bear on the inner surface of the nipple to guide the valve, there being a diametrically arranged slot through the body of the valve, a pin having its ends seated in the nipple, and which pin passes through the slot in the body of the valve to limit the movement in both directions, a flange integral with the rear end of the valve body, the edge of which flange is formed to fit the valve seat within the nipple, there being a slot formed in the rear end of the body of the valve, and which valve is moved rearwardly and unseated by the reciprocation of the faucet valve.

In testimony whereof, we have signed our names to this specification, in presence of two subscribing witnesses.

HENRY F. MIKESCH.
EDWARD ROMAN.

Witnesses:
M. P. SMITH,
H. G. FLETCHER.